United States Patent [19]

Morand

[11] Patent Number: 4,700,017
[45] Date of Patent: Oct. 13, 1987

[54] BALL JOINT FOR LAMP

[75] Inventor: Michel J. E. D. Morand, Montreal, Canada

[73] Assignee: Norman Wade Company Ltd., Toronto, Canada

[21] Appl. No.: 916,741

[22] Filed: Oct. 8, 1986

[30] Foreign Application Priority Data

Feb. 20, 1986 [CA] Canada .................................. 502,319

[51] Int. Cl.$^4$ ............................................. H02G 3/04
[52] U.S. Cl. ...................................... 174/86; 285/185; 285/907; 362/287; 362/421; 403/73; 403/74; 403/113; 403/146; 439/8
[58] Field of Search ................... 174/86; 362/285, 287, 362/418, 421; 403/73, 74, 113, 117, 146, 161; 339/2 R, 2 A, 5 A; 285/185, 907

[56] References Cited

U.S. PATENT DOCUMENTS

| 274,572 | 3/1883 | DeQuillfeldt | 403/73 |
| 460,952 | 10/1891 | Converse | 403/161 X |
| 598,202 | 2/1898 | Harrell | 403/91 X |
| 896,182 | 8/1908 | Villard | 403/161 X |
| 921,833 | 10/1906 | Hespe et al. | 174/86 |
| 1,080,405 | 12/1913 | Andersen | 403/91 |
| 1,123,839 | 1/1915 | Bridges | 403/145 X |
| 2,434,986 | 1/1948 | Bremer | 362/421 X |
| 3,213,273 | 10/1965 | Zagel | 403/103 X |
| 3,475,042 | 10/1969 | Speers et al. | 403/91 |

FOREIGN PATENT DOCUMENTS 2846863 5/1980 Fed. Rep. of Germany ........ 174/86
158859 11/1921 United Kingdom .................. 174/86

Primary Examiner—Morris H. Nimmo
Attorney, Agent, or Firm—Riches, McKenzie & Herbert

[57] ABSTRACT

A ball joint is disclosed to couple together elements of an electric lamp fixture. Two semi-spherical ball joint members are pivotalbly mounted about a pin so as to form a sphere. An arm portion extends from each ball joint member along its equatorial plane. Each arm draws its ball joint member into a socket having a truncated spherical surface so that semi-spherical surfaces of both semi-spherical ball joint members are drawn into sliding contact with truncated spherical surfaces of the socket. In drawing both ball joint members into the socket, the two ball joint members are urged together. The forces with which the arm portion is drawn into the socket determines frictional forces required to rotate each socket relative to the ball joint members as well as one ball joint member relative to the other ball joint member. A continuous passageway passes internally through the ball joint through which electrical wires may pass. The noval construction utilizes semi-spherical ball joint members which are identical and may be manufactured by injection molding at low cost.

20 Claims, 7 Drawing Figures

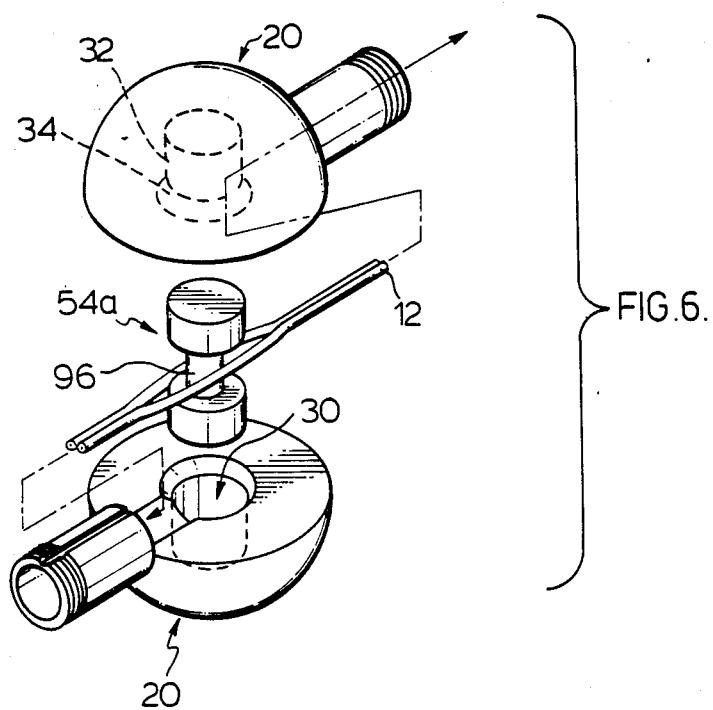
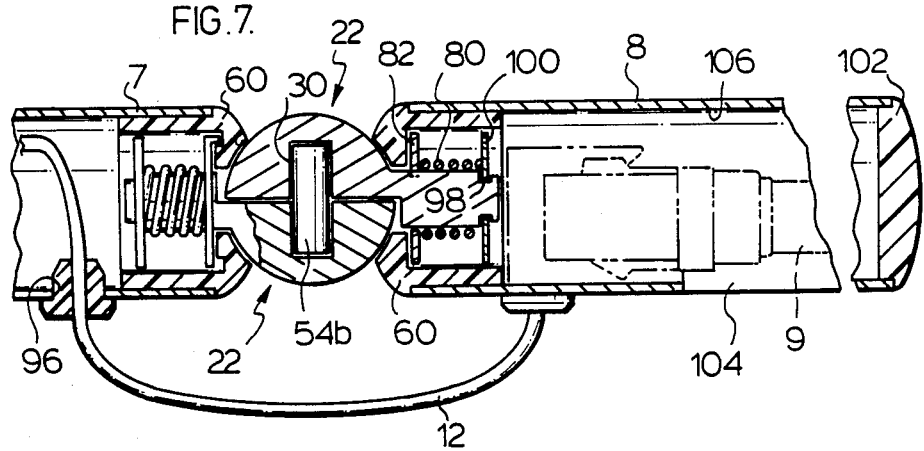

BALL JOINT FOR LAMP

SCOPE OF THE INVENTION

This invention relates to ball joints and more particularly to ball joints for light fixtures permitting articulated movement of elements of the light fixture to a variety of position.

BACKGROUND OF THE INVENTION

Many coupling systems are known for light fixtures which permit the light fixture to be bent into a plurality of desired orientations. For example, lamps with articulated joints are used by draftsmen to direct light onto different locations on a drafting board. Many coupling systems such as that disclosed in U.S. Pat. No. 1,080,405 only permit pivoting of a lamp head about a single axis. However, to provide desired articulated motion, pivoting is desired to be about two axis with one axis roughly normal to the other. Known coupling joints which permit such articulated motion are typically expensive, lack a decorative appeal and are difficult to manufacture small in size. Further, many such coupling joints with articulated motion do not permit electrical wires to be conveniently concealed within the fixture.

SUMMARY OF THE INVENTION

Accordingly, it is an object of the present invention to at least partially overcome these disadvantages of the prior devices by providing a new ball joint for coupling two elements together for articulated movement with respect to each other.

Another object is to provide a compact, decorative ball joint which can be manufactured inexpensively and assembled with ease.

Another object is to provide a ball joint for light fixtures in which wires may pass internally through the ball joint concealed from view.

Another object is to provide a ball joint permitting two elements to be pivoted with respect to each other about two substantially normal axes with a single biasing means establishing the resistance to rotation about both axes.

Another object is to provide an improved light fixture incorporating the articulated ball joint of the present invention.

Accordingly, in one of its aspects the present invention provides a ball joint for coupling two elements together for articulated movement with respect to each other, the ball joint comprising two identical, semi-spherical ball joint members, each having a semi-spherical body portion and an arm portion extending therefrom, each body portion having an outer semi-spherical surface and a planar equatorial surface with a blind bore extending into the body portion from the center of the equatorial surface normal thereto, each arm portion extending outwardly from the semi-spherical surface of the body portion about an axis which is a radius of the semi-spherical body portion lying in the equatorial surface, pin means extending from the blind bore of one ball joint member into the bore of the other ball joint member whereby the members are pivotable with respect to each other about the pin means with their equatorial surfaces in sliding, abutting contact, two socket forming means, each having a socket with a truncated spherical surface and an opening within the socket centrally thereof extending away from the socket, a first of the socket forming means adapted to be coupled to a first of said element, the other, second of the socket forming means adapted to be coupled to the other, second of said elements, first coupling means retaining the arm portion of the first ball joint member in the opening of the first socket forming means with outer semispherical surfaces of both body portions urged into contact with the truncated spherical surfaces of the first socket forming means so that the first socket forming means is pivotable with respect to both ball joint members about the axis of the first arm portion with semispherical surfaces of both body portions in sliding contact with the truncated spherical surface of the first socket forming means, second coupling means retaining the arm portion of the second ball joint member in the opening of the second socket forming means with outer semi-spherical surfaces of both body portions urged into contact with the truncated spherical surfaces of the second socket forming means so that the second socket forming means is pivotable with respect to both ball joint members about the axis of the second arm portion with semi-spherical surfaces of both body portions in sliding contact with the truncated spherical surface of the second socket forming means.

In another aspect the present invention provides a ball joint for coupling two elements together for articulated movement with respect to each other, the ball joint comprising two semi-spherical ball joint members, each having a semi-spherical body portion and an arm portion extending therefrom, the body portions having outer semi-spherical surfaces of the same radius, the semi-spherical ball joint members coupled together pivotable with respect to each other about an axis normal to equatorial surfaces thereof centered on the equatorial surfaces whereby the body portions form a sphere in all pivotable positions, the arm portion extending outwardly from the semispherical surface of the body portion about an axis which is a radius of the semi-spherical body portion lying in an equatorial plane thereof, two socket forming means, each having a socket with a truncated spherical surface and an opening within the socket centrally thereof extending away from the socket, a first of the socket forming means adapted to be coupled to a first of said elements and a second of the socket forming means adapted to be coupled to a second of said elements, first biasing means drawing the arm portion of the first ball joint member into the opening of the first socket forming means thereby urging outer semi-spherical surfaces of both body portions into contact with the truncated spherical surfaces of the first socket forming means so that the first socket forming means is pivotable with respect to both ball joint members about the axis of the first arm portion with semispherical surfaces of both body portions in sliding contact with the truncated spherical surface of the first socket forming means, second biasing means drawing the arm portion of the second ball joint member into the opening of the first socket forming means thereby urging outer semi-spherical surfaces of both body portions into contact with the truncated spherical surfaces of the second socket forming means so that both socket forming means are pivotable about the axis of the second arm portion with semispherical surfaces of both body portions in sliding contact with the truncated spherical surface of the second socket forming means, each biasing means, in drawing the arm portions into the openings to urge semi-spherical surfaces of both body portions into contact with the truncated spherical surfaces, urging the semi-spherical ball joint members together, each biasing means being adjustable to vary the biasing forces urging the arm portions into the openings and thereby vary frictional forces required to be overcome to pivot the ball joint members with respect to each other and to pivot a respective socket forming means with respect to the ball joint members.

A ball joint is provided to couple together elements of an electric lamp fixture. Two semi-spherical ball joint members are pivotably mounted about a pin so as to form a sphere. An arm portion extends from each ball joint member along its equatorial plane. Each arm draws its ball joint member into a socket having a truncated spherical surface so that semi-spherical surfaces of both semi-spherical ball joint members are drawn into sliding contact with truncated spherical surfaces of the socket. In drawing both ball joint members into the socket, the two ball joint members are urged together. The forces with which the arm portion is drawn into the socket determines frictional forces required to rotate each socket relative to the ball joint members as well as one ball joint member relative to the other ball joint member. Preferably a continuous passageway passes internally through the ball joint through which electrical wires may pass. For example, holes through each arm portion may open into a central cavity defined between semi-spherical body portions of the ball joint members.

BRIEF DESCRIPTION OF THE DRAWINGS

Further objects and advantages of the invention will appear from the following description taken together with the accompanying drawings in which:

FIG. 6 is an exploded view similar to FIG. 4 showing the use of an alternate pivot pin; and FIG. 7 is a schematic partially cut-away and partially cross-sectioned side view of a ball joint in accordance with a second embodiment of the present invention.

DETAILED DESCRIPTION OF THE DRAWINGS

Figure 1:
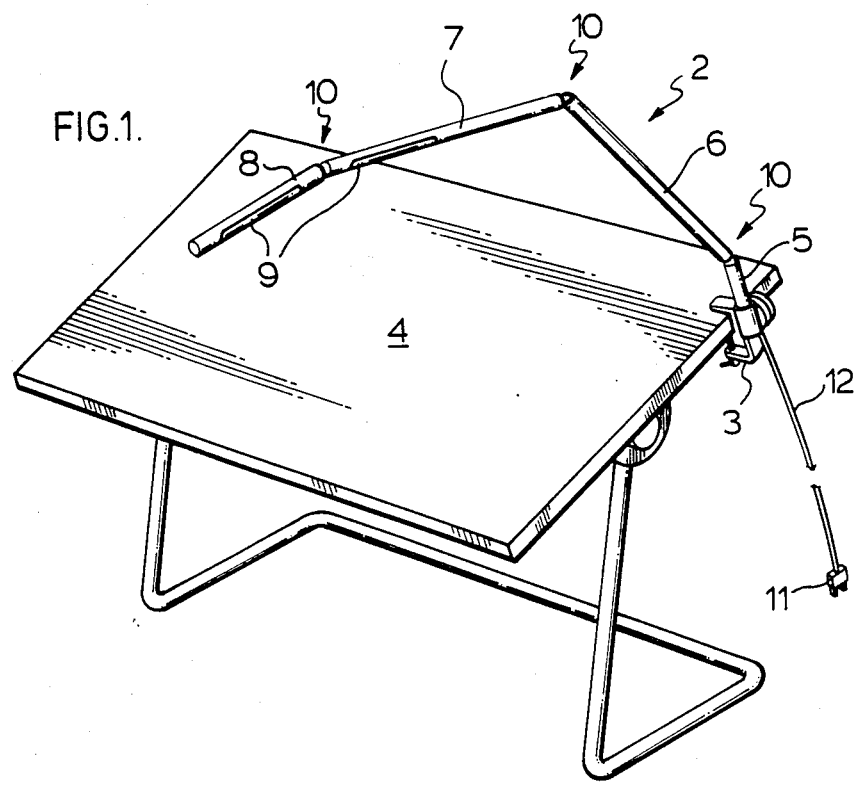
FIG. 1 is a pictorial view of a light fixture in accordance with the present invention having a number of ball joints and shown mounted on a drafting table.

Reference is made first to FIG. 1 which shows a light fixture 2 in accordance with the present invention coupled for illustration by clamp 3 to drafting table 4. The light fixture comprises in sequence, tubular elements 5, 6, 7 and 8 each coupled to neighbouring elements by ball joints indicated as 10. Tubular elements 7 and 8 carry in cut out portions thereof elongate light bulbs 9. Each ball joint 10 permits articulated movement of the elements it couples together and the light fixture may be moved to various orientations to cast light from bulbs 9 as desired onto table 4. In accordance with the preferred first embodiment of the ball joint shown in FIG. 1, an electrically conducting wire 12 passes from plug 11 to element 5 and then, concealed internally, through the tubular elements and ball joints to bulbs 9.

FIGS. 2 to 5 show ball joint 10 between elements 6 and 7 as seen in FIG. 1. Ball joint 10 comprises five major parts, namely, two identical semi-spherical ball joint members 20, two identical socket forming members 60 and pivot pin 54.

Each ball joint member has a semi-spherical body portion 22 and an arm portion 24 extending therefrom. Body portion 22 has a semi-spherical outer surface 26 and a planar equatorial surface 28. A blind bore 30 extends into the body portion 22 from the center of equatorial surface 28 normal thereto. Bore 30 is cylindrical at its innermost extent, indicated as end section 32, and widens as it approaches a central section 34 near the equatorial surface 28.

Arm portion 24 extends outwardly from the semi-spherical surface of body portion 22 as a rod with a cylindrical outer surface 38 lying on an axis indicated as 40 which is an extension of a radius of the semispherical body portion lying in the equatorial surface 28 of its body portion. That is, axis 40 lies on an extension of a line passing through the center of the sphere of which semi-circular surface 26 forms a part and as well this line lies in the equatorial plane of this sphere.

Arm portion 24 has a central passageway 42 internally therethrough from its first end 44 near body portion 22 to its second end 46 remote from the body portion. A groove 48 is cut out of body portion 22 so as to effectively extend passageway 42 internally within body portion 22 from the arm portion into communication with blind bore 30.

The outer cylindrical surface 38 of arm portion 24 is threaded with threads 50 near its remote end 46. A keyway slot 52 is provided in outer surface 38 running axially the length of arm portion 24.

Pivot pin 54 comprises a cylindrical member of a radius complementarily sized to be rotatably received in the end sections 32 of bores 30. A central aperture 56 extends through pin 54 normal to the axis of the cylindrical pin with aperture 56 widening toward each of its ends.

Figure 2:
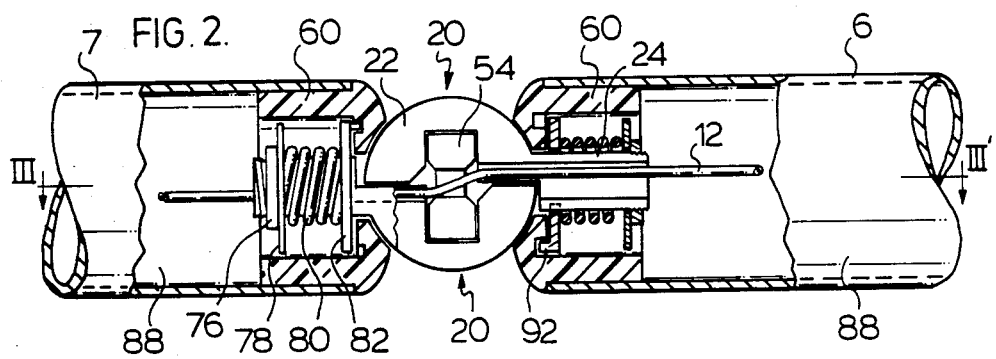
FIG. 2 is a schematic, partially cut-away and partially cross-sectioned side view of one of the ball joints shown in FIG. 1.

With pin 54 received in bores 30 between the two half ball joint members 20 as seen in FIG. 2, the half ball joint members are pivotable with respect to each other about the axis of pin 54 with their equatorial surfaces 28 in sliding abutting contact. Arm portion 24 of each ball joint member does not extend into the space occupied by the body portion 22 of the other ball joint member and thereby does not interfere with the ball joint members pivoting about pin 54, other than when the ball joint members may be pivoted so far in one direction that the two arm portions 24 may contact each other. The body portions 22 form a sphere in all their relative pivotable positions.

A continuous conduit is formed through ball joint 10 from remote end 46 of one arm portion 24 to remote end 46 of the other arm portion 24 via passageways 42, grooves 48, the central section 34 of bore 30 and central aperture 56 of pin 54. Wire 12 is shown passing through this continuous conduit. By suitable sizing of aperture 56 and grooves 48, relative to the diameter of wire 12, the continuous conduit exists in all relative pivotable positions of half ball members 20.

Socket forming members 60 are provided at a first, forward end 62 with a socket 64 defined by truncated spherical surface 66 of a radius complementary to that of the outer semi-spherical surfaces 26 of ball joint members 20. An opening 68 centrally in socket 64 extends rearwardly therefrom to the second, rear end 70 of the socket forming member. Opening 68 widens as it extends rearwardly from socket 64 forming a rear cylindrical bore portion 72. This widening provides a shoulder 74 about the opening facing away from the socket.

Opening 68 extends rearwardly of socket 64 centered about a line which lies along a radius of a sphere of which the truncated spherical surfaces of each socket forming means forms a part. Each arm portion may be received in the opening with the axis of its cylindrical surface 38 lying along this line.

Each arm portion 24 extends rearwardly through opening 68 into rear bore portion 72. Nut 76 is threaded onto arm portion 24 to retain the arm portion in opening 68. Nut 76 is threaded onto arm portion 24 with washer 78, spring 80 and washer 82 between nut 76 and shoulder 74 so as to compress spring 80. Each compressed spring biases its respective arm portion 24 rearward thereby urging outer semi-spherical surfaces 26 of both body portions 22 into contact with the truncated spherical surfaces 66 of the respective socket forming member 60 so that the respective socket forming member 60 is pivotable with respect to both ball joint members 20 about the axis of arm portion 24 with semi-spherical surfaces 26 of both body portions 22 in sliding contact with the truncated spherical surface 66 of the respective socket forming members.

The biasing forces of spring 80 in urging the semi-spherical surfaces of both body portions into contact with the truncated spherical surfaces also urges the two half ball members together into contact over their equitorial surfaces. Thus adjustment of the threaded location of each nut 76 to vary the compression of spring 80 will vary: (a) the frictional forces required to be overcome to pivot one ball joint member with respect to the other ball joint member, and (b) the frictional forces required to be overcome to pivot a respective socket forming member with respect to both ball joint members.

Suitable sizing of the areas of contact between opposed equatorial surfaces as well as between outer semi-spherical surfaces and truncated spherical surfaces can allow for the relative frictional forces (a) and (b) above to be established having regard to materials of constructions and surface roughness.

Figure 3:
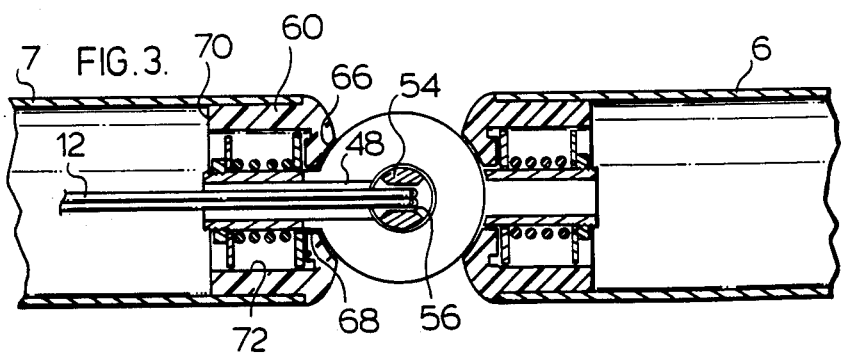
FIG. 3 is a cross-sectional top view of the ball joint of FIG. 2 along line III-III' in FIG. 2.
Figure 4:
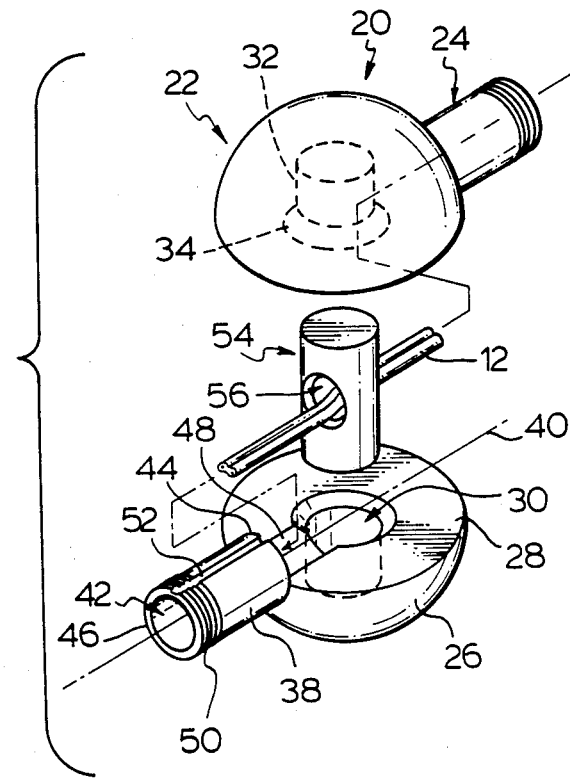
FIG. 4 is a schematic exploded view of the semi-circular body portions, pivot pin and wire shown in FIG. 3.
Figure 5:
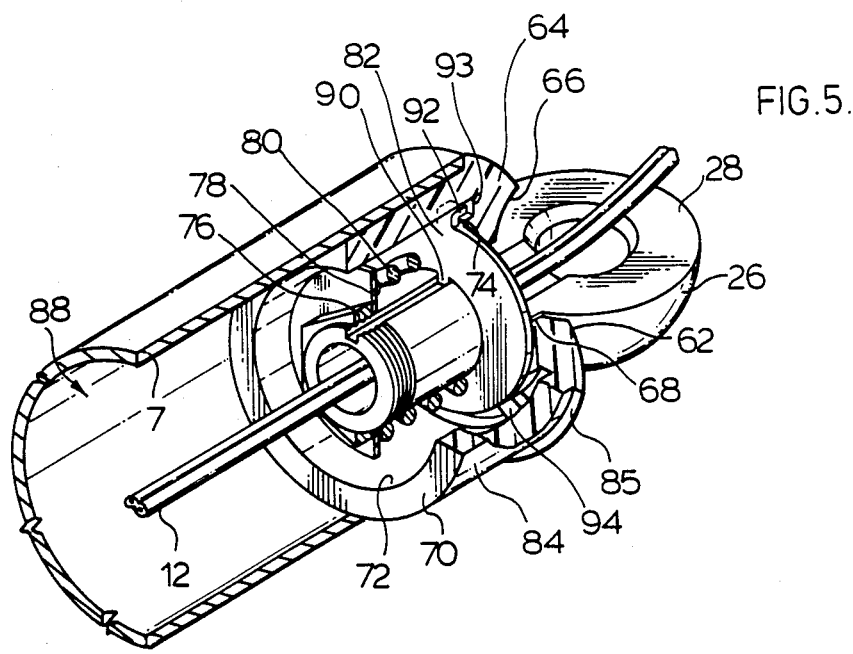
FIG. 5 is a cut-away pictorial view of the left half of the ball joint seen in FIG. 3.

Each socket forming member 60 has an outer cylindrical surface 84 ending at shoulder 85. Elements 6 and 7 as seen in FIGS. 2 and 3 are hollow cylindrical tubes which may slide in removable force fit relation over surface 84 for coupling to socket forming members 60. If desired, radially extending locking screws (not shown) may lock either element 6 or 7 to the socket forming member.

Each element 6 or 7 is permitted articulated motion with respect to each other about two separate axis. One axis runs longitudinally through the respective element. The other axis extends centrally through blind bores 30 of the ball joint. These two axis are normal to each other.

Wire 12 is shown in FIGS. 2 and 3 to extend from the central passageway or interior 88 of the one element 6 internally through ball joint 10 to the interior 88 of the other element 7. To prevent repeated rotation of either element with respect to the other from unduly twisting wire 12, washer 82 carries internal key 90 received in keyway slot 52 of outer cylindrical surface 38 of arm portion 24. Washer 82 also carries an external prong or key 92 which extends into circumferential groove 93 in shoulder 74. Groove 93 extends circumferentially with the exception of where stop key 94 fills the groove and serves to be contacted by prong 92. In this manner, arm portion 24 is keyed via washer 82 to socket 60 so as to pivot less than 360° between positions in which washer prong 92 abuts key 94.

Reference is now made to FIG. 6 which shows an alternate embodiment of a pivot pin 54. Alternate pivot pin 54a shown in FIG. 6 has a spool-like shape with a centrally disposed reduced diameter portion or circumferential groove 96 thereabout providing in effect an opening through pivot pin 54a through which wire 12 may pass. More precisely with pin 54a in blind bores 30, a cavity is defined between groove 96 and the enlarged center sections 34 of bores 30.

The pin 54 shown in FIGS. 2 to 5 will have wire 12 passing therethrough and accordingly pin 54 will need to be rotatable with respect to both body portions 22 to maintain its orientation with wire 12. In contrast pin 54a may be rotated to any position and provide passage for wire 12. Accordingly, pin 54a could be secured to one body portion 22 or be formed integrally therewith so that one body portion includes pin 54a and the other a mating bore 30.

Reference is now made to FIG. 7 which shows a second embodiment of the ball joint in accordance with the present invention in which wire 12 is passed externally about ball joint 10 rather than internally. In FIG. 7 similar reference numbers identify similar components disclosed with respect to FIGS. 1 to 5. In FIG. 7, wire 12 extends out of the interior of elements 5 and 6 via openings 96 in each element. No conduit is provided through arm portions 24 or body portion 22. Bore 30 is a cylindrical bore and pin 54b a cylindrical pin. Pin 54b may be integrally formed with one of the body portions.

In FIG. 7, rather than provide a threaded nut 76, arm portion has a cylindrical groove 98 with spring clip 100 to be received therein to compress spring 80 a preselected amount. As is the case in FIGS. 2 to 5, washer 82 is keyed to arm portion 24 and provide means to prevent relative pivoting of members 7 and 8 more than 360° with respect to each other so that wire 12 will not be unduly twisted or tensioned.

FIG. 1 shows the provision of bulbs 9 in two adjacent elements 7 and 8 as is advantageous to provide preferred lighting. Each bulb 9 is received in a cut away portion 104 of element 7 or 8, preferably with the back surface 106 of the element providing a light reflecting surface. Decorative end cap 102 closes the end of element 8.

As to materials of construction, elements 5 to 8 preferably are lightweight metal tubes as for example of aluminum. Semi-spherical ball joint members 20 preferably are injection moulded plastic as are socket forming elements 60, particularly where identical components are to be used.

The ball joints of the two illustrated preferred elements show preferred use of pivot pins 54 about which the body portions 22 are pivotable. While such pins are preferred many other systems will occur to a person skilled in the art to guide rotation. For example, one body portion could have circular peripheral grooves at the outer periphery of its equatorial surface to mate with complimentary grooves in the other body portion. Further if each body portion were substantially hollow to define a central cavity therebetween, wires could readily pass through the ball joint.

In the preferred embodiments illustrated tubular elements 5, 6, 7 and 8 have been shown to be cylindrical tubes. Advantageously each of the tubes may have a shape such that the socket forming members 60 will not rotate therein, as for example, with the tubular elements 5 appearing eliptical, oval, triangular or rectangular in cross-section and the socket forming members 60 having a complementary shape.

While the invention has been described with reference to preferred embodiments, the invention is not so limited. Many modifications and variations will now occur to those skilled in the art. For example, a ball joint as described may be useful as a universal joint to join two mechanisms as in the case of providing an articulating joint for a child's toy. For a definition of the invention, reference is made to the appended claims.

What I claim is:

1. A ball joint for coupling two elements together for articulated movement with respect to each other, the ball joint comprising:
    two identical, semi-spherical ball joint member, each having a semi-spherical body portion and an arm portion extending therefrom,
    each body portion having an outer semi-spherical surface and a planar equatorial surface with a blind bore extending into the body portion from the center of the equatorial surface normal thereto,
    each arm portion extending outwardly from the semi-spherical surface of the body portion about an axis which is a radius of the semi-spherical body portion lying in the equatorial surface,
    pin means extending from the bore of one ball joint member into the bore of the other ball joint member whereby the members are pivotable with respect to each other about the pin means with their equatorial surfaces in sliding, abutting contact,
    two socket forming means, each having a socket with a truncated spherical surface and an opening within the socket centrally thereof extending away from the socket,
    a first of the socket forming means adapted to be coupled to a first of said elements,
    the other second of the socket forming means adapted to be coupled to the other, second of said elements,
    first coupling means retaining the arm portion of the first ball joint member in the opening of the first socket forming means with outer semi-spherical surfaces of both body portions urged into contact with the truncated spherical surfaces of the first socket forming means so that the first socket forming means is pivotable with respect to both ball joint members about the axis of the first arm portion with semi-spherical surfaces of both body portions in sliding contact with the truncated spherical surface of the first socket forming means,
    second coupling means retaining the arm portion of the second ball joint member in the opening of the second socket forming means with outer semi-spherical surfaces of both body portions urged into contact with the truncated spherical surfaces of the second socket forming means so that the second socket forming means is pivotable with respect to both ball joint members about the axis of the second arm portion with semi-spherical surfaces of both body portions in sliding contact with the truncated spherical surface of the second socket forming means.

2. The ball joint of claim 1 wherein each arm portion comprises a cylindrical member about the respective axis which is a radius of the semi-spherical body portion lying in the equatorial surface.

3. The ball joint of claim 2 wherein each arm portion is received in the opening of a respective socket forming means so that the axis of the cylindrical member lies along a radius of a sphere of which the truncated spherical surfaces of each socket forming means forms a part.

4. The ball joint of claim 3 wherein the truncated spherical surfaces are of complementary radius to the outer semi-spherical surfaces of the semi-spherical ball joint members.

5. The ball joint of claim 1 further including:
    passageway means through each ball joint member from a remote end of the arm portion internally through the arm portion into the blind bore,
    passageway means through the pin means,
    the passageway means through the ball joint members and the passageway means through the pin providing a continuous passageway internally through the ball joint adapted to receive wire means.

6. The ball joint of claim 5 wherein the passageway means through the pin means comprises an aperture through said pin means.

7. The ball joint of claim 6 wherein the pin means comprises a cylindrical member with said aperture normal to the axis thereof.

8. The ball joint of claim 1 wherein the pin means and blind bores are configured to provide a cavity therebetween extending across the equatorial surfaces to open into both ball joint members,
    passageway means through each ball joint member from a remote end of the arm portion internally through the arm portion into the cavity,
    the passageway means of both ball joint members and the cavity providing a continuous passageway internally through the ball joint member and adapted to receive wire means.

9. The ball joint of claim 8 wherein said pin means comprises a cylindrical member with a groove normal to the axis thereof cut into its cylindrical outer surface, the cavity being defined in said groove between the pin means and blind bores.

10. The ball joint of claim 8 wherein said blind bores are cylindrical and said pin means comprises a cylindrical member having a reduced diameter portion intermediate its ends, the cavity being defined between the reduced diameter portion and the blind bores.

11. The ball joint of claim 5 wherein each arm portion comprises a hollow cylindrical tubular member.

12. The ball joint of claim 8 wherein each arm portion comprises a hollow cylindrical tubular member.

13. The ball joint of claim 1 wherein each said opening within the socket centrally thereof enlarges as it extends away from the socket to define a shoulder facing away from the socket, each coupling means abutting the shoulder to retain the arm portion in the opening against removal.

14. The ball joint of claim 1 wherein said socket forming means has two ends with the socket at a forward end thereof,
    the opening extending rearward from the socket to an enlarged bore at the other rearward end of the socket forming means,
    a shoulder about the opening disposed in the enlarged bore facing rearward away from the socket, each coupling means comprising:
  nut means adjustably threadably received on the arm portion within the bore rearward of the shoulder; and
  spring means disposed between the shoulder and nut means which on compression by the nut means biases the arm portion rearwardly into the opening.

15. A ball joint for couling together two elements of an electrical fixture for articulated movement with respect to each other and with electrically conducting wires concealed internally within the ball joint member, the ball joint member comprising:

two semi-spherical ball joint members, each having a semi-spherical body portion and an arm portion extending therefrom, the body portions having outer semi-spherical surfaces of the same radius, the semi-spherical ball joint members coupled together pivotably with respect to each other about an axis normal to the equatorial surfaces thereof centered on the equatorial surfaces whereby the body portions form a sphere in all pivotable positions, each arm portion comprising a tubular member extending outwardldy from the semi-spherical surface of the body portion along a radius of the semi-spherical body portion in the equatorial surface thereof, the tubular member being hollow with a passageway therethrough through its length from a first end proximate the body portion to a second end remote from the body portion, the ball joint members when coupled together defining internally therebetween a central cavity in communication with the passageways of both tubular members at the first ends thereof in all relative pivotable positions of the ball joint members, the cavity and passageways defining a continuous conduit internally through the ball joint from the remote end of one tubular member to the remote end of the other tubular member and adapted to receive wires, two socket forming means, each having a socket with a truncated spherical surface and an opening within the socket centrally thereof extending away from the socket, a first of the socket forming means adapted to be coupled to a first of said elements, the other, second of the socket forming means adapted to be coupled to the other, second of said elements, first coupling means retaining the arm portion of the first ball joint member in the opening of the first socket forming means with outer semi-spherical surfaces of both body portions urged into contact with the truncated spherical surfaces of the first socket forming means so that the first socket forming means is pivotable with respect to both ball joint members about the axis of the first arm portion with semi-spherical surfaces of both body portions in sliding contact with the truncated spherical surface of the first socket forming means, second coupling means retaining the arm portion of the second ball joint member in the opening of the second socket forming means with outer semi-spherical surfaces of both body portions urged into contact with the truncated spherical surfaces of the second socket forming means so that the second socket forming means is pivotable with respect to both ball joint members about the axis of the second arm portion with semi-spherical surfaces of both body portions in sliding contact with the truncated spherical surface of the second socket forming means.

16. An electrical fixture having two elements coupled together by ball joint means for articulated movement of the elements with respect to each other, (I) each element having internal passageway means,
(II) the ball joint means comprising:
  (a) two semi-spherical ball joint members, each having a semi-spherical body portion and an arm portion extending therefrom,
  the body portions having outer semi-spherical surfaces of the same radius,
  the semi-spherical ball joint members coupled together to be pivotable with respect to each other about an axis normal to equatorial surfaces thereof centered on the equatorial surfaces whereby the body portions form a sphere in all pivotable positions, each arm portion comprising a tubular member extending outwardly from the semi-spherical surface of the body portion along a radius of the semi-spherical body portion in the equatorial surface thereof,
  the tubular member being hollow with a passageway therethrough throughout its length from a first end proximate the body portion to a second end remote from the body portion,
  the ball joint members when coupled together defining internally therebetween a central cavity in communication with the first passageways of both tubular members at the first ends thereof in all relative pivotable positions of the ball joint members,
  the cavity and passageways defining a continuous conduit internally through the ball joint from the remote end of one tubular member to the remote end of the other tubular member;
  (b) two socket forming means each having a first end and a second end, a socket at each first end with a truncated spherical surface and an opening within the socket centrally thereof extending through the respective socket forming member to its second end, the second end of each socket forming means coupled to a respective one of the elements with the internal passageway means of the respective element in communication with the opening of the respective socket forming means;
  (c) first coupling means retaining the arm portion of the first ball joint member in the opening of the first socket forming means with outer semi-spherical surfaces of both body portions urged into contact with the truncated spherical surfaces of the first socket forming means so that the first socket forming means is pivotable with respect to both ball joint members about the axis of the first arm portion with semi-spherical surfaces of both body portions in sliding contact with the truncated spherical surface of the first socket forming means; and
  (d) second coupling means retaining the arm portion of the second ball joint member in the opening of the second socket forming means with outer semi-spherical surfaces of both body portions urged into contact with the truncated spherical surfaces of the second socket forming means so that the second socket forming means is pivotable with respect to both ball joint members about the axis of the second arm portion with semi-spherical surfaces of both body portions in sliding contact with the truncated spherical surface of the second socket forming means, (III) wire means passing internally of said ball joint means between the passageway means of the elements through the continuous conduit and openings of the socket forming means.

17. The fixture of claim 16 wherein each element comprises a hollow tubular element, the second end of the socket forming means adapted to removably slide into the tubular element for coupling thereto.

18. The ball joint of claim 1 wherein the truncated spherical surfaces are disposed so that on contact with the semi-spherical surfaces of both body portions, the truncated spherical surfaces urge the semi-spherical ball joint members together into contact over their equatorial surfaces.

19. The ball joint of claim 14 wherein the truncated spherical surfaces are disposed so that on contact with the semi-spherical surfaces of both body portions, the truncated spherical surfaces urge the semi-spherical ball joint members together into contact over their equatorial surfaces, adjustment of each nut means varies the forces by which the spring means biases a respective arm portion rearwardly into the opening and thereby varies frictional forces required to be overcome to pivot the ball joint members with respect to each other and to pivot a respective socket forming means with respect to the ball joint members.

20. A ball joint for coupling two elements together for articulated movement with respect to each other, the ball joint comprising:

two semi-spherical ball joint members, each having a semi-spherical body portion and an arm portion extending therefrom, the body portions having outer semi-spherical surfaces of the same radius, the semi-spherical ball joint members coupled together to be pivotable with respect to each other about an axis normal to equatorial surfaces thereof centered on the equatorial surfaces whereby the body portions from a sphere in all pivotable positions, the arm portion extending outwardly from the semi-spherical surface of the body portion about an axis which is a radius of the semi-spherical body portion lying in an equatorial plane thereof, two socket forming means, each having a socket with a truncated spherical surfaces and an opening within the socket centrally thereof extending away from the socket, a first of the socket forming means adapted to be coupled to a first of said elements and a second of the socket forming means adapted to be coupled to a second of said elements, first biasing means drawing the arm portion of the first ball joint member into the opening of the first socket forming means thereby urging outer semi-spherical surfaces of both body portions into contact with the truncated spherical surfaces of the first socket forming means so that the first socket forming means is pivotable with respect to both ball joint members about the axis of the first arm portion with semi-spherical surfaces of both body portions in sliding contact with the truncated spherical surface of the first socket forming means, second biasing means drawing the arm portion of the second ball joint member into the opening of the second socket forming means thereby urging outer semi-spherical surfaces of both body portions into contact with the truncated spherical surfaces of the second socket forming means so that both socket forming means are pivotable about the axis of the second arm portion with semi-spherical surfaces of both body portions in sliding contact with the truncated spherical surface of the second socket forming means, each biasing means, in drawing the arm portions into the openings to urge semi-spherical surfaces of both body portions into contact with the truncated spherical surfaces, urging the semi-spherical ball joint members together, each biasing means being adjustable to vary the biasing forces urging the arm portions into the openings and thereby vary frictional forces required to be overcome to pivot the ball joint members with respect to each other and to pivot a respective socket forming means with respect to the ball joint members.

* * * * *